Patented Sept. 21, 1943

2,330,090

UNITED STATES PATENT OFFICE 2,330,090

TREATMENT OF HYDROCARBON OILS

Charles L. Thomas and Herman S. Bloch, Chicago, Ill., assignors to Universal Oil Products Company, Chicago, Ill., a corporation of Delaware No Drawing. Application April 29, 1939,
Serial No. 270,924

6 Claims. (Cl. 196—50)

This invention relates to the conversion of hydrocarbons substantially within the gasoline boiling point range to produce a gasoline product of increased antiknock value.

More specifically, the invention relates to a modified process of reforming hydrocarbons whereby the hydrocarbon oil undergoes conversion in the presence of particular and specific types of catalysts which function to selectively promote the formation of high antiknock gasoline. The preferred catalysts useful for carrying out the conversion are prepared synthetically by definite steps of procedure which are specific in the production of catalysts of high activity for prolonged use.

The art of pyrolytically cracking hydrocarbons of relatively high boiling point to produce large yields of gasoline is extensive and well known. The more recent art of thermally reforming hydrocarbons whereby hydrocarbons substantially within the gasoline boiling point range and having low antiknock value are modified with simultaneous formation of more or less gas so that a gasoline product of higher antiknock value results, has also undergone considerable commercial development. The application of catalysts in this latter field, however, is a new development and relatively only a very little is known about such processes. A considerable number of catalysts have been proposed for improving the antiknock value of gasoline which have objectionable features in that the catalyst proposed may be readily poisoned or be difficult or practically impossible to regenerate when in prolonged use. For example, reduced metal catalysts have the disadvantage of being sensitive to sulfur poisoning and are quickly coated with carbonaceous material which render them practically inert. The deposition of carbonaceous material is frequently related to the type of decomposition selectively accelerated by the catalyst.

Under conditions used, the preferred catalysts for the process of the present invention accelerate for the major part reactions involving the dehydrogenation and isomerization of paraffin hydrocarbons, or the dehydrogenation of naphthene hydrocarbons, for example, to form higher antiknock hydrocarbons. Reactions involving scission of carbon to carbon bonds are accelerated to a lesser degree. Thus there are reactions where decanes for example are dehydrogenated and branched chain decenes are formed and there are also some reactions where butanes and butenes are formed from octenes for example. The gaseous olefins which are formed to some extent are readily polymerizable to form additional yields of high antiknock motor fuel. Generally speaking, more drastic conditions are employed in strictly thermal reforming than in catalytic reforming treatment so that reactions of a mixed character result involving extensive secondary reactions rather than more largely the primary reactions as above described.

The preferred catalysts for the process of the present invention comprise specially composited synthetic masses prepared by admixing their precipitated components under conditions whereby alkali metal ions are not included in the catalyst. The components used in the preparation of these catalysts are specially prepared silica hydrogel, and a precipitated oxide from the group of metals consisting of vanadium, tin, chromium, zinc, molybdenum and thallium, all of which yield the desired catalyst, although the catalysts are not fully equivalent in their respective activities. These metal oxides when used alone at the high temperatures necessary to carry out the desired reactions undergo irreversible physical and chemical reactions so that their catalytic activity is considerably reduced or even destroyed. As a result of compositing these oxides under regulated conditions with a specially prepared precipitated hydrated silica having large surface and being amorphous or imperfectly crystallized, catalysts of highly refractory nature are produced. These catalysts are characterized by their prolonged activity under alternate conditions of use and regeneration, their ease of manufacture and exact reproducibility. In the description of these catalysts they are referred to as silica-vanadia, for example, or silica with one of the metallic oxides enumerated since some form of these compounds is involved during preparation. Inasmuch as the chemistry of the true solid state is very incompletely developed, it has not been determined how these materials are arranged within the catalyst.

In one specific embodiment the present invention comprises a method of converting hydrocarbons within the gasoline boiling point range having relatively low antiknock value into gasoline of high antiknock value and elevated temperatures and at substantially atmospheric to moderately superatmospheric pressures in contact with synthetically prepared masses of hydrated silica together with a hydrated oxide of a metal selected from the group consisting of vanadium, tin, chromium, zinc, molybdenum and thallium prepared by special methods of compositing or mixing whereby alkali metal ions are excluded before forming and calcining at elevated temperatures, said masses being highly refractory and capable of withstanding for long periods of time the conditions of temperature employed in alternate reaction and reactivation periods.

In a further specific embodiment minor amounts of the lower olefins, more particularly propene and butenes which are formed concurrently with the high antiknock gasoline are polymerized to form additional yields of high antiknock gasoline.

According to the present invention the gasoline boiling point range hydrocarbons may be processed at temperatures of the usual high pressure thermal reforming range but at substantially atmospheric or slightly superatmospheric pressure while in contact with the synthetically composited catalysts above mentioned. These catalysts may be prepared by a number of alternative methods which have certain necessary features in common as will be subsequently described. Generally speaking, however, the catalysts may be considered to comprise an intimate admixture of hydrated silica and a hydrated oxide, both of the components indicating more or less low activity individually but in the aggregate displaying high activity in accelerating the desired reactions. The activity is not an additive function and in some cases it appears to be relatively constant for a wide range of proportions of the components whether in molecular or fractions of molecular proportions. Neither component should be looked upon as the one component for which the remaining component may be considered as the promoter, nor should one component be considered as the support and the other as the catalyst proper, both components possibly exerting mutually cooperating effects.

In general, the preferred catalysts are prepared by precipitating silica from a solution as a gel, purifying, subsequently admixing or depositing the metallic oxide component upon the hydrated silica and thereafter drying or forming and calcining. One of the more convenient methods of preparing the silica gel is to acidify an aqueous solution of sodium silicate by the addition of an acid such as hydrochloric acid for example. Excess acid and the concentration of the solution in which the precipitation is brought about determine in some measure the suitability of the silica hydrogel for subsequent compositing with the remaining component. In general, suitable hydrated silica may be produced by the use of dilute solutions of sodium silicate and the addition of a moderate excess of acid whereby the desired active silica gel is obtained and conditions of filtering and washing are at an optimum. After precipitating the hydrated silica it is treated and washed to substantially remove alkali metal ions.

It is not known whether the alkali metal ions such as sodium ions are present in the primary gel in chemical combination or in an adsorbed state, but it has been definitely determined that their removal is necessary if catalysts suitable for prolonged use in accelerating the desired reactions are to be obtained. It is possible that the presence of the alkali metal impurities causes a sintering or fluxing of the surfaces of the catalyst at elevated temperatures so that the porosity is much reduced with corresponding reduction in effective surface. Alkali metal ions may be removed by treating with solutions of acidic materials, ammonium salts generally or salts of the metal ion of the component composited with the hydrated silica. When treating with acids as for example with hydrochloric acid, the acid extracts the alkali metal impurities in the silica gel. The salts formed and acid are then substantially removed by water washing treatment. Where ammonium salts or salts of the multivalent metals are used, the ammonium or multivalent metal used apparently displace the alkali metal impurities present in the composite and the alkali metal salts formed together with the major portion of the multivalent metal salts are removed in the water washing treatment. Some of the multivalent metal introduced into the silica hydrogel in the purifying treatment may become a permanent part of the composite, whereas, in the treatment with ammonium salts, small amounts of the ammonium salts remaining after the washing process will be driven off in subsequent treatment at elevated temperatures.

In one of the preferred methods of compositing the hydrated materials, the purified precipitated hydrated silica gel may be suspended in a solution of a salt of the metal ion of the added component in the desired proportion and a hydrated oxide deposited upon the hydrated silica by the addition of volatile basic precipitants such as ammonium hydroxide, for example, or ammonium carbonate, ammonium hydrosulfide, ammonium sulfide or other volatile basic precipitants such as organic bases may be employed. According to this method, the purified silica gel may be suspended in a solution of pure stannic chloride, for example, and a hydrated oxide of tin precipitated by the addition of ammonium hydroxide. By another method, the purified hydrated silica gel may be mixed while in the wet condition with a solution of a salt of one of the designated metals containing the said metal in the anion, and the hydrated metal oxide precipitated by the addition of an acid. According to this latter method, the purified silica gel may be suspended in an ammoniacal solution of ammonium molybdate or ammonium vanadate, for example, and molybdic or vanadic acid precipitated by the addition of hydrochloric acid.

Alternatively, the purified hydrated silica gel may be mixed while in the wet condition with a separately prepared hydrated oxide precipitated by the addition of volatile basic precipitants to a solution of a relatively pure salt of the metal constituting the metal oxide. The hydrated oxide thus prepared is substantially free from alkali metal ions and can be admixed with the purified silica gel. However, if alkali metal ions are incorporated when adding the hydrated oxide, regulated purification treatment and water washing are required by methods selected from those described in connection with the purification of the hydrated silica gel to remove alkali metal ions. Care should be observed in the selection and concentration of reagents used so as not to dissolve unduly large amounts of the added hydrated oxide. As further alternatives, the purified silica gel may be added to a solution of a metal salt of the metal oxide to be incorporated, said oxide being deposited by hydrolysis with or without the use of heat, or the purified silica gel may be mixed with a suitable amount of the metal salt to form a paste and the paste heated whereby the metal oxide is deposited upon the silica gel as a result of the decomposition of the metal salt.

The character and efficiency of the ultimately prepared catalyst will vary more or less with the conditions of precipitation and/or mixing, purification treatment ratio of components, calcining, etc. The ratio of components may be varied within wide limits, the limiting factor with respect to activity being more in evidence with small proportions of the added metal oxide component. In general, it appears that from 1 to 20 mol per cent of the added metal oxide component with reference to silica may be considered an approximation of the range of proportions.

After the hydrated oxide has been mixed with or deposited upon the purified hydrated silica gel and water washed, if desired, the catalytic material may be recovered as a filter cake and dried at a temperature of the order of 240–300° F. more or less after which it may be formed into particles of a suitable size range from powder to various formed sizes obtained by pressing and sizing, or otherwise formed before or after drying into desired shapes by extrusion or compression methods. By calcining at temperature of the order of approximately 850–1000° F. or higher, maximum activity of the catalyst is obtained and a further dehydration occurs so that the water content is of the order of 2 to 3 percent.

Catalysts prepared by the various types of procedures outlined evidently possess a large total contact surface corresponding to a desirable porosity, the pores of the catalyst particles being of such size and shape that they do not become clogged with carbonaceous deposits after a long period of service and are therefore not difficult to reactivate by oxidation. This structure is also retained after many alternate periods of use and reactivation as evidenced by the fact that the catalysts may be repeatedly reactivated by passing air or other oxidizing gas over the spent particles to burn off deposits of carbonaceous material present at temperatures above 800° F., without apparently affecting the catalytic activity.

In accordance with the present invention the catalysts may be conveniently utilized in reforming hydrocarbons when employed as filling material in tubes or chambers in the form of small pellets or granules. The average particles size may be within the approximate range of 1–10 mesh which may apply either to pellets of uniform size and short cylindrical shapes produced by extrusion and subsequently drying, or particles of irregular size and shape, these being produced by powdering, consolidating and sizing of the partially dehydrated materials. While a simple method of preheating the hydrocarbon vapors to a temperature suitable for their reforming in contact with the catalysts and then passing the vapors over a stationary mass of catalyst particles may be employed, in some cases it is preferable to pass the preheated vapors through or around a plurality of relatively small diameter tubes in multiple and parallel connection having catalysts disposed in or around said tubes, since this latter arrangement of apparatus is better adapted to permit heating and cooling of the catalyst masses to compensate for the heat absorbed where the reactions are endothermic and to dissipate heat during the regeneration of the catalyst. After the passage of the hydrocarbon vapors over the catalysts, the reaction products are cooled and the hydrogen-containing gas is separated from the improved hydrocarbon product. Olefin hydrocarbons produced in small proportions in the above treatment, more particularly propene and butenes, may be directed with or without separation from the remaining gaseous components to polymerizing treatment, thermal or catalytic, to produce further yields of high antiknock gasoline.

The temperatures employed in contact with the catalysts will vary according to the boiling point range and type of hydrocarbons constituting the gasoline processed, the temperatures used, however, being within the range of 850–1250° F. Subatmospheric pressures to moderately superatmospheric pressure up to 100 pounds per square inch or more may be used, such pressures being somewhat governed by flow conditions through the vaporizing and conversion zone and the subsequent separating fractionating and cooling equipment.

More frequently the charging stock to the process may comprise a straight run gasoline which is low in anti-knock value but the process is not restricted to this type of charging stock since various types of hydrocarbon mixtures of low antiknock value may be processed according to this invention with improved results in the gasoline product, such low antiknock hydrocarbons comprising for example naphtha cuts, gasoline lacking in light and/or heavy ends, cracked gasoline, synthetic products, etc.

The following specific examples are given to illustrate the process of the invention. The invention should not, however, be considered as limited to the specific operating conditions of these examples or to the proportions and particular catalyst preparation exemplified since these details are given to illustrate the novelty of the catalytic process constituting this invention.

*Example I*

A suitable catalyst has the following approximate composition: 100 mols silica ($SiO_2$) and 4 mols of stannic oxide ($SnO_2$). It was prepared according to the procedures described above, the general method being to precipitate a silica gel and to purify same by the removal of alkali metal ions, and then suspend the purified precipitated silica in a solution of stannic chloride, precipitating hydrated stannic oxide in the presence of the suspended hydrated silica by the use of ammonium hydroxide.

Granules of 6–10 mesh prepared from the above described preparations were disposed in a vertical cylindrical chamber and heated to maintain a temperature of approximately 1112° F. Vaporized Mid-Continent straight run gasoline having an octane number of 41 was rapidly preheated to a temperature of 1112° at substantially atmospheric pressure and directed through the catalytic material in a single pass. The gasoline and gas from the above processing were cooled and separated and the results were as follows: A yield of 85% by volume of the charging stock of a motor fuel product was obtained having an end point of 430° F. and an octane number of 60.7. The propene and butenes present in the gas derived from the process may be readily polymerized to form a polymer gasoline of approximately 83 octane number corresponding to approximately 3.7 weight per cent of the charge. A suitable catalyst for carrying out said polymerization may be a phosphoric acid-containing catalyst consisting essentially of a precalcined mixture of phosphoric acid and a siliceous adsorbent.

In processing the same charging stock in presence of the same catalyst but at lower temperature, for example 1022° F., the increase in octane number of the reformed gasoline was not as great. Only a small percentage of polymerizable olefins was formed and the hydrogen content of the gas was much higher, i. e., it constituted 71 volume per cent of the total gas.

*Example II*

As a further example of a catalyst suitable for processing according to the present invention, a catalyst containing vanadium oxide was prepared having the following approximate composition—100 mols of silica ($SiO_2$) and 2 mols of vanadic oxide ($V_2O_5$). The catalyst was prepared similarly as the catalyst in Example I.

When processing the same charging stock as used in Example I, in presence of 6 to 10 mesh granules of this catalyst at a temperature of approximately 1112° F. in a single pass, a yield of 85% by volume of the charging stock of product having a 59.5 octane number was obtained. An additional yield of 3.6% by weight of the charging stock of 83 octane number gasoline was obtainable by polymerization of the propene and butenes prepared concurrently with the gasoline in the above catalytic treatment.

In the appended claims the catalyst is designated as "a synthetic alkali-metal-ion-free catalytic mass comprising essentially a hydrated silica composited with a precipitated hydrous oxide of a metal selected from the group consisting of vanadium, tin, chromium, zinc, molybdenum and thallium." Some form of these compounds is involved during their preparation. However, the state of chemical combination or the exact chemical form of the components incorporated into the catalyst after the catalyst preparation has been completed is not known.

We claim as our invention:

1. A process for treating low boiling hydrocarbons boiling within the approximate range of motor fuel to increase their antiknock value and concurrently produce minor yields of normally gaseous polymerizable olefins which comprises subjecting said low boiling hydrocarbons at a temperature within the approximate range of 850–1250° F. and below a pressure of approximately 100 pounds per square inch to contact with particles of a synthetic alkali metal ion-free catalytic mass comprising essentially a calcined mixture of a precipitated hydrated silica gel and a precipitated hydrous oxide of a heavy metal selected from the group consisting of vanadium, tin, chromium, zinc, molybdenum and thallium.

2. A process for treating low boiling hydrocarbons boiling within the approximate range of motor fuel to increase their antiknock value and concurrently produce minor yields of normally gaseous polymerizable olefins which comprises subjecting said low boiling hydrocarbons at a temperature within the approximate range of 850–1250° F. and below a pressure of approximately 100 pounds per square inch to contact with particles of a synthetic alkali metal ion-free catalytic mass comprising essentially a calcined mixture of a precipitated hydrated silica gel and a precipitated hydrous oxide of a heavy metal selected from the group consisting of vanadium, tin, chromium, zinc, molybdenum and thallium, subjecting the treated vapors from said contact to fractionation to separate and remove hydrocarbons above the motor fuel boiling point range, condensing, cooling and separating the hydrocarbon products.

3. A process for treating low boiling hydrocarbons boiling within the approximate range of motor fuel to increase their antiknock value which comprises subjecting said low boiling hydrocarbons at a conversion temperature to contact with particles of a synthetic alkali metal ion-free catalytic mass comprising essentially a calcined mixture of a precipitated hydrated silica gel and a precipitated hydrous oxide of a heavy metal selected from the group consisting of vanadium, tin, chromium, zinc, molybdenum and thallium.

4. A process as claimed in claim 3 where the catalytic mass comprises essentially a hydrated silica composited with a precipitated hydrous oxide of vanadium.

5. A process as claimed in claim 3 where the heavy metal is tin.

6. A process as claimed in claim 3 where the catalytic mass comprises essentially a hydrated silica composited with a precipitated hydrous oxide of chromium.

CHARLES L. THOMAS.
HERMAN S. BLOCH.